(12) United States Patent
Luo et al.

(10) Patent No.: US 11,740,505 B2
(45) Date of Patent: Aug. 29, 2023

(54) DISPLAY CONTROL METHODS, DISPLAY APPARATUSES AND COMPUTER-READABLE STORAGE MEDIA

(71) Applicants: Beijing BOE Display Technology Co., Ltd., Beijing (CN); BOE Technology Group Co., Ltd., Beijing (CN)

(72) Inventors: Tingting Luo, Beijing (CN); Luqiang Guo, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 251 days.

(21) Appl. No.: 17/203,357

(22) Filed: Mar. 16, 2021

(65) Prior Publication Data
US 2022/0050328 A1  Feb. 17, 2022

(30) Foreign Application Priority Data

Aug. 14, 2020 (CN) .......................... 202010818677.1

(51) Int. Cl.
*G02F 1/1335* (2006.01)
*G02F 1/1347* (2006.01)
(Continued)

(52) U.S. Cl.
CPC ...... *G02F 1/133601* (2021.01); *G02F 1/1347* (2013.01); *G02F 1/133504* (2013.01);
(Continued)

(58) Field of Classification Search
CPC ......... G02F 1/133601; G02F 1/133504; G02F 1/133528; G02F 1/1347; G02F 2202/28;
(Continued)

(56) References Cited

U.S. PATENT DOCUMENTS

2008/0259233 A1  10/2008  Krijn et al.
2008/0266226 A1  10/2008  Park et al.
(Continued)

FOREIGN PATENT DOCUMENTS

CN  101295093 A  10/2008
CN  101341763 A  1/2009
(Continued)

OTHER PUBLICATIONS

A search report (X2009011B4).
CN2020108186771 first office action.

*Primary Examiner* — Charles S Chang
(74) *Attorney, Agent, or Firm* — IPRO, PLLC

(57) ABSTRACT

The present disclosure provides a display control method, a display apparatus and a computer-readable storage medium. The display control method is applied to the display apparatus including a backlight component, and a first liquid crystal display panel and a second liquid crystal display panel that are stacked. The first liquid crystal display panel is located between the backlight component and the second liquid crystal display panel and configured to display a first image, and the second liquid crystal display panel is configured to display a second image. The method includes: in response to entering an image adjustment display mode, acquiring control information for controlling movement of a display position of the first image; and moving the display position of the first image based on the control information.

13 Claims, 9 Drawing Sheets

(51) Int. Cl.
*G06F 3/01* (2006.01)
*G09G 3/36* (2006.01)

(52) U.S. Cl.
CPC ........ *G02F 1/133528* (2013.01); *G06F 3/013* (2013.01); *G09G 3/36* (2013.01); *G02F 2202/28* (2013.01); *G09G 2300/023* (2013.01); *G09G 2340/0464* (2013.01); *G09G 2354/00* (2013.01)

(58) Field of Classification Search
CPC .... G06F 3/013; G09G 3/36; G09G 2300/023; G09G 2340/0464; G09G 2354/00
USPC ...................................................... 349/74–75
See application file for complete search history.

(56) References Cited

U.S. PATENT DOCUMENTS

| | | |
|---|---|---|
| 2009/0284518 A1 | 11/2009 | Sawabe |
| 2010/0118006 A1 | 5/2010 | Kimura |
| 2011/0043549 A1 | 2/2011 | Chestakov et al. |
| 2012/0281028 A1 | 11/2012 | Orlick et al. |
| 2014/0035972 A1 | 2/2014 | Hasegawa et al. |
| 2014/0168070 A1 | 6/2014 | Jeong et al. |
| 2016/0170702 A1 | 6/2016 | Jiang et al. |
| 2016/0180782 A1 | 6/2016 | Nakaya |
| 2016/0189336 A1 | 6/2016 | Lee et al. |
| 2018/0136479 A1 | 5/2018 | Wei |
| 2018/0286339 A1 | 10/2018 | Koudo et al. |
| 2019/0236826 A1* | 8/2019 | Kamiyoshihara .... G09G 3/3611 |
| 2019/0258101 A1* | 8/2019 | Yasui ...................... G02F 1/137 |
| 2019/0279581 A1 | 9/2019 | Furuta et al. |
| 2020/0118502 A1* | 4/2020 | Hirotsune ............. G02F 1/1323 |
| 2021/0041730 A1 | 2/2021 | Yue et al. |

FOREIGN PATENT DOCUMENTS

| | | |
|---|---|---|
| CN | 101467199 A | 6/2009 |
| CN | 101981497 A | 2/2011 |
| CN | 102667904 A | 9/2012 |
| CN | 103293692 A | 9/2013 |
| CN | 103595986 A | 2/2014 |
| CN | 103870773 A | 6/2014 |
| CN | 104994373 A | 10/2015 |
| CN | 105654903 A | 6/2016 |
| CN | 105719608 A | 6/2016 |
| CN | 108877694 A | 11/2018 |
| CN | 110398865 A | 11/2019 |
| CN | 210376949 U | 4/2020 |
| CN | 111176010 A | 5/2020 |
| JP | H0927969 A | 1/1997 |
| JP | 2009095475 A | 5/2009 |
| JP | 2013148911 A | 8/2013 |
| JP | 2017026992 A | 2/2017 |

* cited by examiner

301
In response to entering an image adjustment display mode, acquire control information for controlling movement of a display position of the first image 302
Move the display position of the first image based on the control information

```
┌─────────────────────────────────────────────────────┐
│ In response to entering the image adjustment display │  401
│ mode, control the first liquid crystal display panel │
│ and the second liquid crystal display panel to       │
│ display the first image and the second image        │
│ respectively, according to the same set of image    │
│ data, where the second image is an image for        │
│ detecting an image quality and is configured to     │
│ determine the presence or absence of image ghosting │
└─────────────────────────────────────────────────────┘
                          │
                          ▼
┌─────────────────────────────────────────────────────┐
│ Receive the control information input by the user,  │  402
│ where the control information includes the movement │
│ direction and the movement distance for controlling │
│ the movement of the display position of the first   │
│ image                                               │
└─────────────────────────────────────────────────────┘
                          │
                          ▼
┌─────────────────────────────────────────────────────┐
│ Move the display position of the first image based  │  403
│ on the movement direction and the movement distance │
└─────────────────────────────────────────────────────┘
                          │
                          ▼
┌─────────────────────────────────────────────────────┐
│ Exit the image adjustment display mode, where when  │  404
│ exiting the image adjustment display mode, the      │
│ display apparatus controls the first liquid crystal │
│ display panel to stop displaying the first image    │
│ and controls the second liquid crystal display      │
│ panel to stop displaying the second image           │
└─────────────────────────────────────────────────────┘
```

FIG. 4

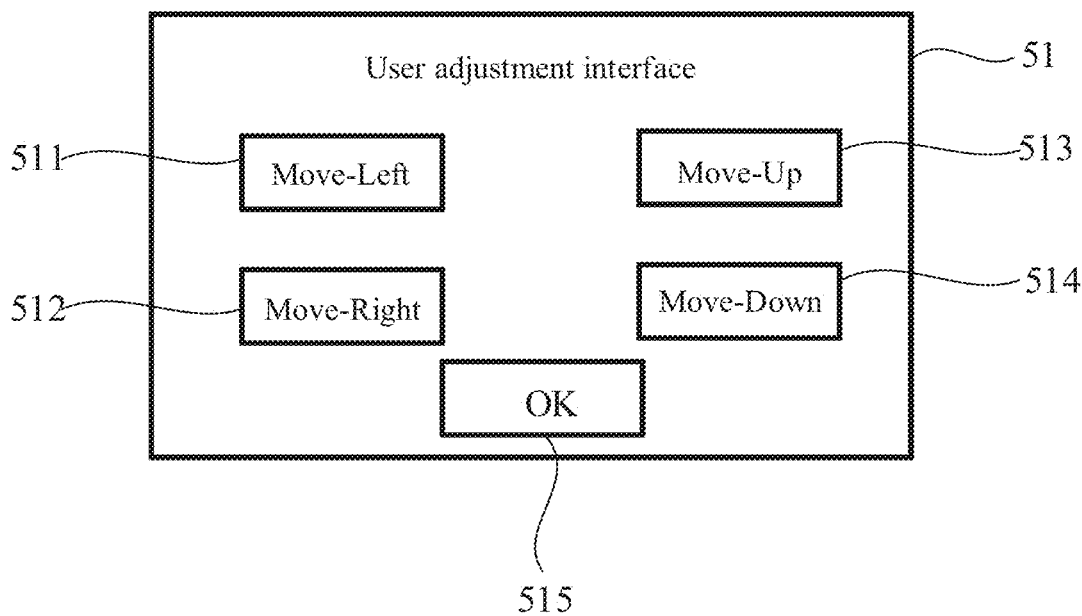

FIG. 5

DISPLAY CONTROL METHODS, DISPLAY APPARATUSES AND COMPUTER-READABLE STORAGE MEDIA

CROSS-REFERENCE TO RELATED APPLICATIONS

The present disclosure claims a priority of the Chinese patent application No. 202010818677.1 filed on Aug. 14, 2020 and entitled "DISPLAY CONTROL METHODS AND DISPLAY APPARATUSES", which is incorporated herein by reference in its entirety.

TECHNICAL FIELD

The present disclosure relates to the field of image processing technology, and in particular to a display control method, a display apparatus and a computer-readable storage medium.

BACKGROUND

Liquid Crystal Display (LCD) has the advantages of good image quality, small size, light weight, low driving voltage, low power consumption, no radiation, relatively low manufacturing cost, etc., and has been widely used in display products such as tablet computers, TVs, mobile phones and on-board displays.

With the continuous development of display technology, an LCD panel has introduced a local dimming technology in order to reduce power consumption and increase contrast of a display image. With the local dimming technology, brightness of each area of a backlight may be adjusted according to an image, to increase brightness of highlighted portions in the image and reduce brightness of dark portions in the image, thereby achieving the best contrast. A solution for local dimming uses a double-layer liquid crystal cell (for example, BOE Dual cell). A display panel with the double-layer liquid crystal cell may include two stacked liquid crystal cells, one of which is used for local dimming, and the other is used for displaying color images or achromatic color images.

SUMMARY

The present disclosure provides a display control method, a display apparatus and a computer-readable storage medium.

According to a first aspect of embodiments of the present disclosure, there is provided a display control method, which is applied to a display apparatus comprising a backlight component, and a first liquid crystal display panel and a second liquid crystal display panel that are stacked, the first liquid crystal display panel being located between the backlight component and the second liquid crystal display panel and configured to display a first image, and the second liquid crystal display panel being configured to display a second image, the method comprising: in response to entering an image adjustment display mode, acquiring control information for controlling movement of a display position of the first image; and moving the display position of the first image based on the control information.

In an embodiment, the control information comprises a movement direction and a movement distance for controlling the movement of the display position; and the first liquid crystal display panel comprises first sub-pixels arranged in an array, and the movement distance uses the first sub-pixel as a unit and is an integer multiple of the first sub-pixel.

In an embodiment, acquiring the control information for controlling the movement of the display position of the first image comprises: receiving the control information input by a user.

In an embodiment, the display apparatus further comprises a camera component, an optical adhesive layer, a first isotropic diffusion film, a second isotropic diffusion film, a first polarizer, and a second polarizer, the optical adhesive layer is located on a side of the first liquid crystal display panel close to the second liquid crystal display panel, the first polarizer is located on a side of the second liquid crystal display panel close to the first liquid crystal display panel, the first isotropic diffusion film and the second isotropic diffusion film are stacked between the optical adhesive layer and the first polarizer, and the second polarizer is located on a side of the second liquid crystal display panel away from the first liquid crystal display panel, and acquiring the control information for controlling the movement of the display position of the first image comprises: in response to entering the image adjustment display mode, controlling the camera component to acquire an eye image; processing the eye image to obtain an offset angle of an eye fixation; determining that the offset angle is within a preset angle range; determining the movement direction based on the offset angle; and determining the movement distance based on the offset angle, a thickness and a refractive index of the first polarizer, a thickness and a refractive index of the optical adhesive layer, a refractive index of air, a thickness and a refractive index of the second liquid crystal display panel, a thickness and a refractive index of the first isotropic diffusion film, and a thickness and a refractive index of the second isotropic diffusion film.

In an embodiment, the movement distance is determined using the following formula:

$$D = k_2 \tan[\arc(k_3 \sin \theta 1)] + k_4 \tan[\arc(k_5 \sin \theta 1)] + k_6 \tan[\arc(k_7 \sin \theta 1)]$$

Wherein D is the movement distance, $k_2$ is the thickness of the second liquid crystal display panel, $k_3 = n0/n2$, n0 is the refractive index of air, n2 is the refractive index of the second liquid crystal display panel, $k_4$ is a sum of the thickness of the first isotropic diffusion film, the thickness of the second isotropic diffusion film, and the thickness of the first polarizer, $k_5 = n0/n3$, n3 is an average of the refractive index of the first isotropic diffusion film, the refractive index of the second isotropic diffusion film, and the refractive index of the first polarizer, $k_6$ is the thickness of the optical adhesive layer, $k_7 = n0/n4$, n4 is the refractive index of the optical adhesive layer, and θ1 is the offset angle of the eye fixation.

In an embodiment, after moving the display position of the first image based on the control information, the method further comprises: determining position information and size information of an image-missing area of the first image based on the control information; determining a reference area in the first image based on the position information and the size information, the reference area being adjacent to the image-missing area, and having a same size as that of the image-missing area; acquiring second image data for filling the image-missing area based on first image data of the reference area; and controlling the image-missing area to display an image based on the second image data.

In an embodiment, acquiring the second image data for filling the image-missing area based on the first image data of the reference area comprises: when a difference in averages of pixel values between every two adjacent rows of sub-pixels arranged along a first direction in the reference area is less than or equal to a preset value, copying the first image data of the reference area to obtain the second image data, the first direction being perpendicular to the movement direction for controlling the movement of the display position; or when the difference in the averages of the pixel values between every two adjacent rows of the sub-pixels arranged along the first direction in the reference area is greater than the preset value, performing average filtering on the first image data and third image data in a neighborhood of the reference area using a preset filter kernel to obtain the second image data.

According to a second aspect of the embodiments of the present disclosure, there is provided a display apparatus, comprising a processor, a backlight component, and a first liquid crystal display panel and a second liquid crystal display panel that are stacked, the first liquid crystal display panel being located between the backlight component and the second liquid crystal display panel and configured to display a first image, the second liquid crystal display panel being configured to display a second image, and the processor being configured to: in response to entering an image adjustment display mode, acquire control information for controlling movement of a display position of the first image; and move the display position of the first image based on the control information.

In an embodiment, the control information comprises a movement direction and a movement distance for controlling the movement of the display position; and the first liquid crystal display panel comprises first sub-pixels arranged in an array, and the movement distance uses the first sub-pixel as a unit and is an integer multiple of the first sub-pixel.

In an embodiment, when acquiring the control information for controlling the movement of the display position of the first image, the processor is further configured to: receive the control information input by a user.

In an embodiment, the display apparatus further comprises a camera component, an optical adhesive layer, a first isotropic diffusion film, a second isotropic diffusion film, a first polarizer, and a second polarizer, the optical adhesive layer is located on a side of the first liquid crystal display panel close to the second liquid crystal display panel, the first polarizer is located on a side of the second liquid crystal display panel close to the first liquid crystal display panel, the first isotropic diffusion film and the second isotropic diffusion film are stacked between the optical adhesive layer and the first polarizer, and the second polarizer is located on a side of the second liquid crystal display panel away from the first liquid crystal display panel, wherein the processor is further configured to: in response to entering the image adjustment display mode, control the camera component to acquire an eye image; process the eye image to obtain an offset angle of an eye fixation; determine that the offset angle is within a preset angle range; determine the movement direction based on the offset angle; determine the movement distance based on the offset angle, a thickness and a refractive index of the first polarizer, a thickness and a refractive index of the optical adhesive layer, a refractive index of air, a thickness and a refractive index of the second liquid crystal display panel, a thickness and a refractive index of the first isotropic diffusion film, and a thickness and a refractive index of the second isotropic diffusion film; and move the display position of the first image based on the movement direction and the movement distance.

In an embodiment, the processor is further configured to determine the movement distance using the following formula:

$$D = k_2 \tan[\arc(k_3 \sin \theta 1)] + k_4 \tan[\arc(k_5 \sin \theta 1)] + k_6 \tan[\arc(k_7 \sin \theta 1)]$$

Wherein D is the movement distance, $k_2$ is the thickness of the second liquid crystal display panel, $k_3 = n0/n2$, n0 is the refractive index of air, n2 is the refractive index of the second liquid crystal display panel, $k_4$ is a sum of the thickness of the first isotropic diffusion film, the thickness of the second isotropic diffusion film, and the thickness of the first polarizer, $k_5 = n0/n3$, n3 is an average of the refractive index of the first isotropic diffusion film, the refractive index of the second isotropic diffusion film, and the refractive index of the first polarizer, $k_6$ is the thickness of the optical adhesive layer, $k_7 = n0/n4$, n4 is the refractive index of the optical adhesive layer, and θ1 is the offset angle of the eye fixation.

In an embodiment, the processor is further configured to: determine position information and size information of an image-missing area of the first image based on the control information; determine a reference area in the first image based on the position information and the size information, the reference area being adjacent to the image-missing area, and having a same size as that of the image-missing area; acquire second image data for filling the image-missing area based on first image data of the reference area; and control the image-missing area to display an image based on the second image data.

In an embodiment, when the second image data for filling the image-missing area is acquired based on the first image data of the reference area, the processor is further configured to: when a difference in averages of pixel values between every two adjacent rows of sub-pixels arranged along a first direction in the reference area is less than or equal to a preset value, copy the first image data of the reference area to obtain the second image data, the first direction being perpendicular to the movement direction for controlling the movement of the display position; or when the difference in the averages of the pixel values between every two adjacent rows of the sub-pixels arranged along the first direction in the reference area is greater than the preset value, perform average filtering on the first image data and third image data in a neighborhood of the reference area using a preset filter kernel to obtain the second image data.

According to a third aspect of the embodiments of the present disclosure, there is provided a computer-readable storage medium having a computer program stored therein, wherein the computer program, when executed by a processor, causes the processor to: in response to entering an image adjustment display mode, acquire control information for controlling movement of a display position of the first image; and move the display position of the first image based on the control information.

It should be understood that the above general description and the following detailed description are merely exemplary and explanatory, and are not intended to limit the present disclosure.

BRIEF DESCRIPTION OF DRAWINGS

The drawings herein, which are incorporated into the specification and constitute a part of the specification, illustrate embodiments in accordance with the present disclosure, and are used together with the specification to explain the principle of the present disclosure.

FIG. 4 is a flowchart illustrating a display control method according to another embodiment of the present disclosure.

FIG. 5 is a schematic diagram illustrating a user adjustment interface according to an embodiment of the present disclosure.

DETAILED DESCRIPTION

Figure 1:
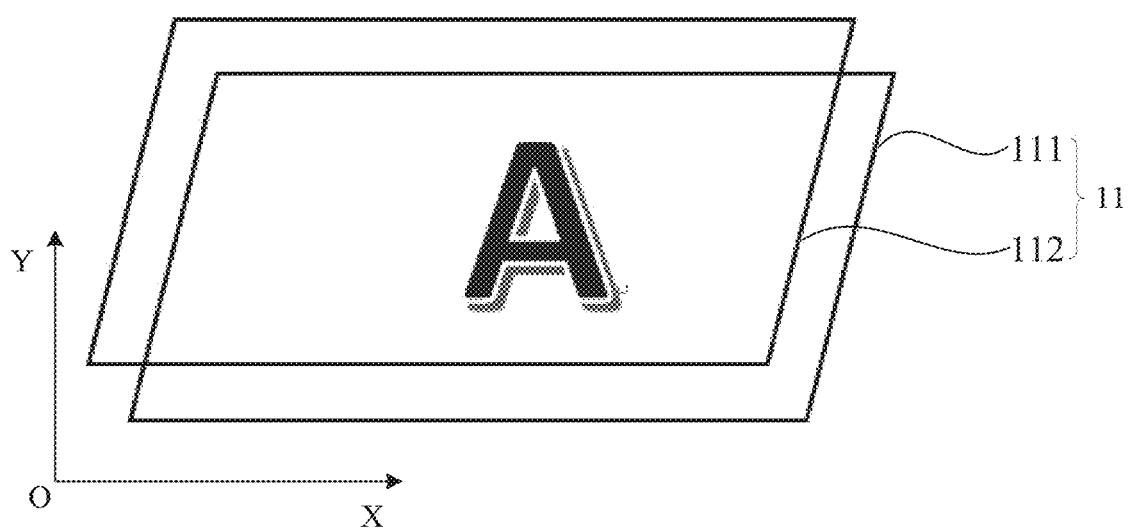
FIG. 1 is a schematic diagram illustrating image ghosting according to the related art.

Exemplary embodiments will be described in detail herein, and examples thereof are illustrated in the drawings. When the following description refers to the drawings, the same numbers in different drawings indicate the same or similar elements, unless otherwise indicated. The implementations described in the following exemplary embodiments do not represent all implementations in accordance with the present disclosure. Rather, they are merely examples of apparatuses and methods in accordance with some aspects of the present disclosure as detailed in the appended claims.

In the related art, as shown in FIG. 1, a display panel 11 with a double-layer liquid crystal cell (for example, BOE Dual cell) includes two liquid crystal cells 111 and 112 that are stacked, in which one liquid crystal cell 111 is used for local dimming, and the other liquid crystal cell 112 is used for displaying color images or achromatic color images. However, as shown in FIG. 1, image ghosting may occur when an image is displayed on the display panel 11 with the double-layer liquid crystal cell. Therefore, how to reduce or eliminate the image ghosting is a technical problem that needs to be solved.

In view of this, embodiments of the present disclosure provide a display control method and a display apparatus.

Figures 2, 3:
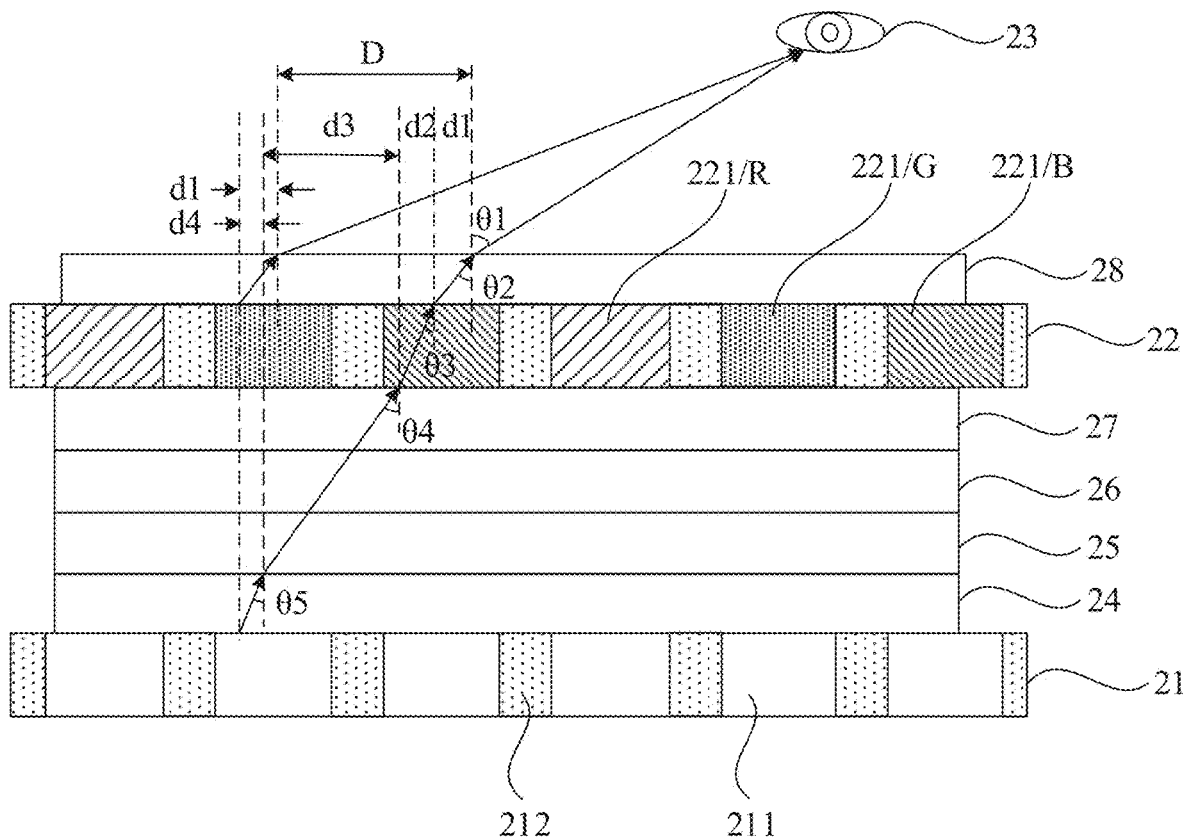
FIG. 2 is a schematic structural diagram illustrating a display apparatus according to an embodiment of the present disclosure.
FIG. 3 is a flowchart illustrating a display control method according to an embodiment of the present disclosure.

The embodiments of the present disclosure provide a display control method. The display control method may be applied to a display apparatus shown in FIG. 2. As shown in FIG. 2, the display apparatus includes a backlight component (not shown), and a first liquid crystal display panel 21 and a second liquid crystal display panel 22 that are stacked. The backlight component is configured to provide backlight for the first liquid crystal display panel 21 and the second liquid crystal display panel 22. The first liquid crystal display panel 21 is located between the backlight component and the second liquid crystal display panel 22 and configured to display a first image, and the second liquid crystal display panel 22 is configured to display a second image. As shown in FIG. 3, the display control method includes steps 301-302.

At step 301, control information for controlling movement of a display position of the first image is acquired in response to entering an image adjustment display mode.

At step 302, the display position of the first image is moved based on the control information.

In an embodiment, the first image may be an achromatic color image, for example, a black-and-white image, and the second image may be an achromatic color image or a color image. The first image has the same content as that of the second image. For example, the content of the first image and the content of the second image may both be capital letters "A". Since there is a gap between the first liquid crystal display panel 21 and the second liquid crystal display panel 22, the first image displayed on the first liquid crystal display panel 21 comes into sight of a user's eyes 23 after being refracted under refraction of light, such that the user may observe a ghost image or double image, especially at large viewing angles. Image ghosting may be more noticeable when the display apparatus displays bar-shaped and line-shaped images. The ghost image is an image with the same content and a similar display position as the second image. The image ghosting may seriously affect the display effect.

In an embodiment, a position of the ghost image relative to the second image may be different due to different viewing angles of the user. For example, as shown in FIG. 1, when the user views the image in a negative X-axis direction, the ghost image is far away from an origin (O) relative to the second image, and has an X-coordinate greater than that of the second image. When the user views the image in a positive X-axis direction, the ghost image is close to the origin (O) relative to the second image, and has an X-coordinate smaller than that of the second image. When the user views the image in a negative Y-axis direction, the ghost image is far away from the origin (O) relative to the second image, and has a Y-coordinate greater than that of the second image. When the user views the image in a positive Y-axis direction, the ghost image is close to the origin (O) relative to the second image, and has a Y-coordinate smaller than that of the second image.

In an embodiment, when the image ghosting occurs in the second image, the display apparatus may move the display position of the first image to reduce or eliminate the image ghosting. A movement direction in which the display position of the first image is moved is opposite to a direction from the second image to the ghost image. For example, when the ghost image is far away from the origin (O) relative to the second image, and has an X-coordinate greater than that of the second image, the direction from the second image to the ghost image is the positive X-axis direction, and in this case, the display position of the first image may be moved in the negative X-axis direction until the image ghosting is reduced or eliminated.

In an embodiment, as shown in FIG. 2, the first liquid crystal display panel 21 may include first sub-pixels 211 arranged in an array, with a black matrix 212 interposed between two adjacent first sub-pixels 211. A movement distance for the display apparatus to move the display position of the first image may use the first sub-pixel 211 (that is, a spacing between the two adjacent first sub-pixels 211) as a unit and may be an integer multiple of the first sub-pixel. For example, the display apparatus may move the display position of the first image by six first sub-pixels 211 in the negative X-axis direction.

In an embodiment, the display apparatus may enter the image adjustment display mode before moving the display position of the first image. The display apparatus may provide an interface for entering the image adjustment display mode, through which the user may control the display apparatus to enter the image adjustment display mode. In response to entering the image adjustment display mode, the display apparatus may acquire the control information for controlling the movement of the display position of the first image, where the control information may include the movement direction and the movement distance for controlling the movement of the display position of the first image. For example, the movement direction may be the negative X-axis direction, and the movement distance may be six first sub-pixels 211 or one first sub-pixel 211, but is not limited thereto.

In an embodiment, the control information may be acquired based on information input by the user to the display apparatus, or acquired based on an offset angle of an eye fixation of the user that is obtained in advance, which is not limited thereto. The way in which the user inputs information to the display apparatus may include touch screen input, mechanical key input, voice input or gesture input, but is not limited thereto.

In an embodiment, after acquiring the control information for controlling the movement of the display position of the first image, the display apparatus may move the display position of the first image according to the control information until the image ghosting in the second image displayed on the second liquid crystal display panel is reduced or eliminated.

In this embodiment, control information for controlling movement of a display position of a first image is acquired in response to entering an image adjustment display mode, and the display position of the first image is moved based on the control information, which can reduce or eliminate image ghosting in a second image displayed on a second liquid crystal display panel. Therefore, with the embodiments of the present disclosure, image ghosting in an image can be reduced or eliminated.

The display control method according to the embodiments of the present disclosure has been briefly introduced above, and the display control method according to the embodiments of the present disclosure will be described in detail below.

The embodiments of the present disclosure further provide a display control method. The display control method may be applied to the display apparatus shown in FIG. 2. In this embodiment, acquiring the control information based on the information input by the user to The display apparatus will be taken as an example for illustration. As shown in FIG. 4, the display control method may include steps 401-404.

At step 401, in response to entering the image adjustment display mode, the first liquid crystal display panel 21 and the second liquid crystal display panel 22 are controlled to display the first image and the second image respectively, according to the same set of image data, where the second image is an image for detecting an image quality and is configured to determine the presence or absence of image ghosting.

In an embodiment, a set of image data may be pre-stored in the display apparatus, and the display apparatus may control the first liquid crystal display panel 21 and the second liquid crystal display panel 22 to display the first image and the second image respectively, according to the set of image data, so as to enable the user to determine whether there is the image ghosting through observation. In response to entering the image adjustment display mode, the display apparatus may call the above image data to control the first liquid crystal display panel 21 to display the first image, and control the second liquid crystal display panel 22 to display the second image, such that the user may determine whether there is the image ghosting in the second image.

At step 402, the control information input by the user is received, where the control information includes the movement direction and the movement distance for controlling the movement of the display position of the first image.

In an embodiment, the display apparatus may display the second image in a user interface, and at the same time, may display a user adjustment interface 51 shown in FIG. 5 in the user interface. The user adjustment interface 51 and the second image may be located in different areas in the user interface, and there is no overlapping area therebetween. The user adjustment interface 51 may include a Move-Left option 511, a Move-Right option 512, a Move-Up option 513, and a Move-Down option 514. When the user selects one of the options, the display apparatus may receive the control information input by the user. For example, every time the user selects (for example, clicks) the Move-Left option 511 once, the control information received by the display apparatus includes: the movement direction being the negative X-axis direction, and the movement distance being one first sub-pixel 211; every time the user selects the Move-Right option 512 once, the control information received by the display apparatus includes: the movement direction being the positive X-axis direction, and the movement distance being one first sub-pixel 2111; every time the user selects the Move-Up option 513 once, the control information received by the display apparatus includes: the movement direction being the positive Y-axis direction, and the movement distance being one first sub-pixel 211; and every time the user selects the Move-Down option 514 once, the control information received by the display apparatus includes: the movement direction being the negative Y-axis direction, and the movement distance being one first sub-pixel 211.

At step 403, the display position of the first image is moved based on the movement direction and the movement distance.

Figure 6:
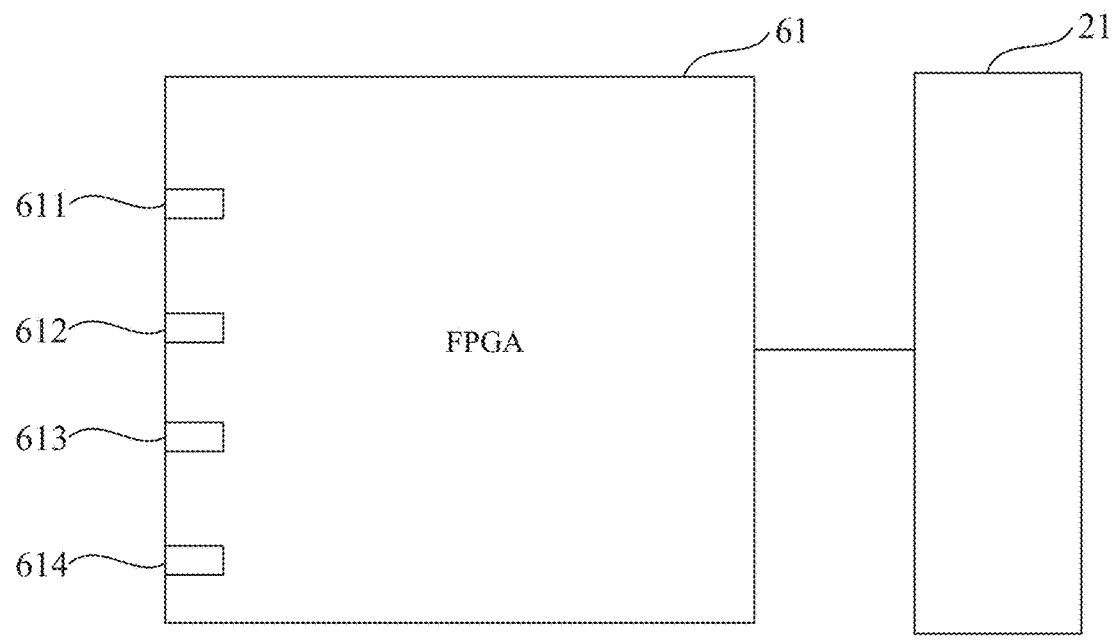
FIG. 6 is a schematic structural diagram illustrating a display apparatus according to another embodiment of the present disclosure.

In an embodiment, the display apparatus may include an FPGA (Field Programmable Gate Array) 61 as shown in FIG. 6. The FPGA 61 may include I/O (Input/Output) interfaces 611-614, which have a one-to-one correspondence with the Move-Left option 511, the Move-Right option 512, the Move-Up option 513 and the Move-Down option 514. Every time the user selects one of the Move-Left option 511, the Move-Right option 512, the Move-Up option 513 and the Move-Down option 514, a high-level pulse may be provided to the corresponding I/O interface. The FPGA 61 may count the high-level pulse, and move the display position of the first image by a corresponding distance in the unit of the first sub-pixel 211 based on the number of the high-level pulse. For example, the Move-Left option 511 may correspond to the I/O interface 611, when the I/O interface 611 receives one high-level pulse, the display position of the first image may be moved in the negative X-axis direction by one first sub-pixel 211, and when the I/O interface 611 receives six high-level pulses, the display position of the first image may be moved in the negative X-axis direction by six first sub-pixels 211.

At step 404, the image adjustment display mode is exited. When exiting the image adjustment display mode, the display apparatus may control the first liquid crystal display panel 21 to stop displaying the first image and control the second liquid crystal display panel 22 to stop displaying the second image.

In an embodiment, after the image ghosting is reduced or eliminated, the user may select an OK option 515 in the user adjustment interface 51, such that the display apparatus may exit the image adjustment display mode to stop displaying the above user interface, that is, the display apparatus may control the first liquid crystal display panel 21 to stop displaying the first image and control the second liquid crystal display panel 22 to stop displaying the second image.

Figure 7:
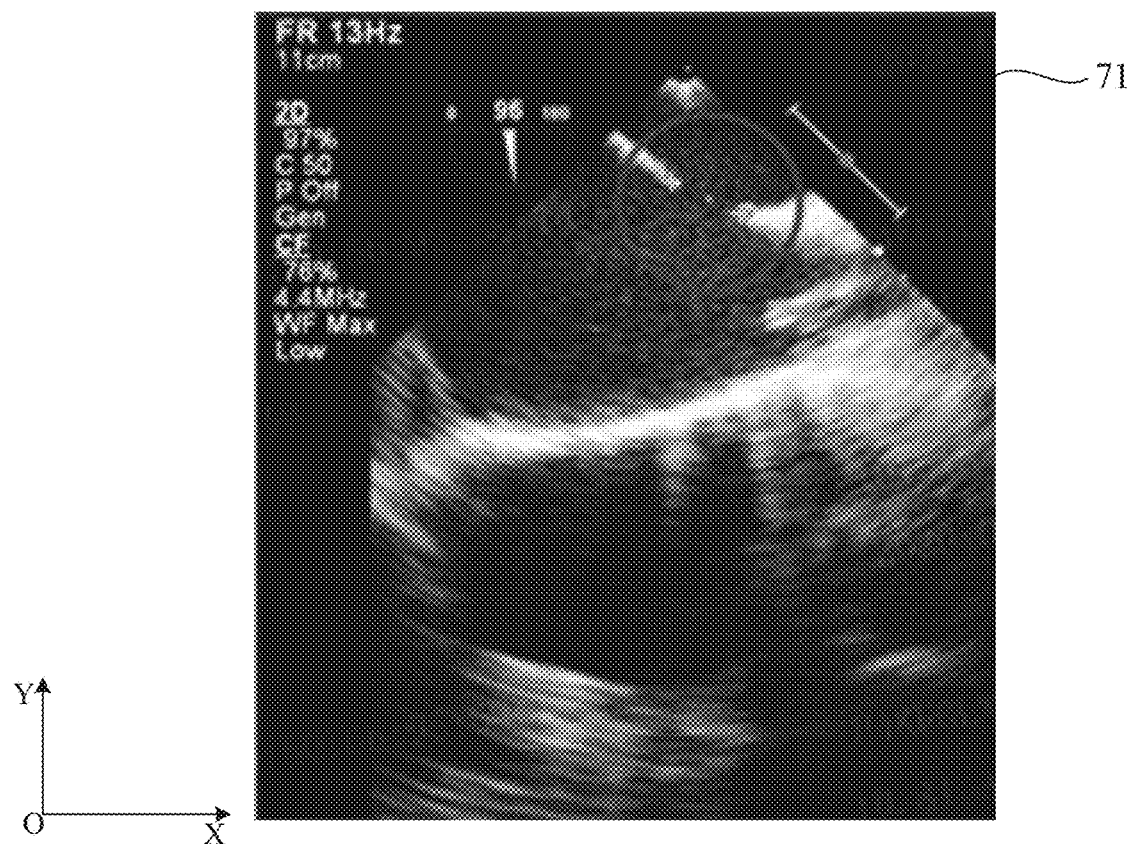
FIG. 7 is a schematic diagram illustrating a first image according to an embodiment of the present disclosure.
Figure 8:
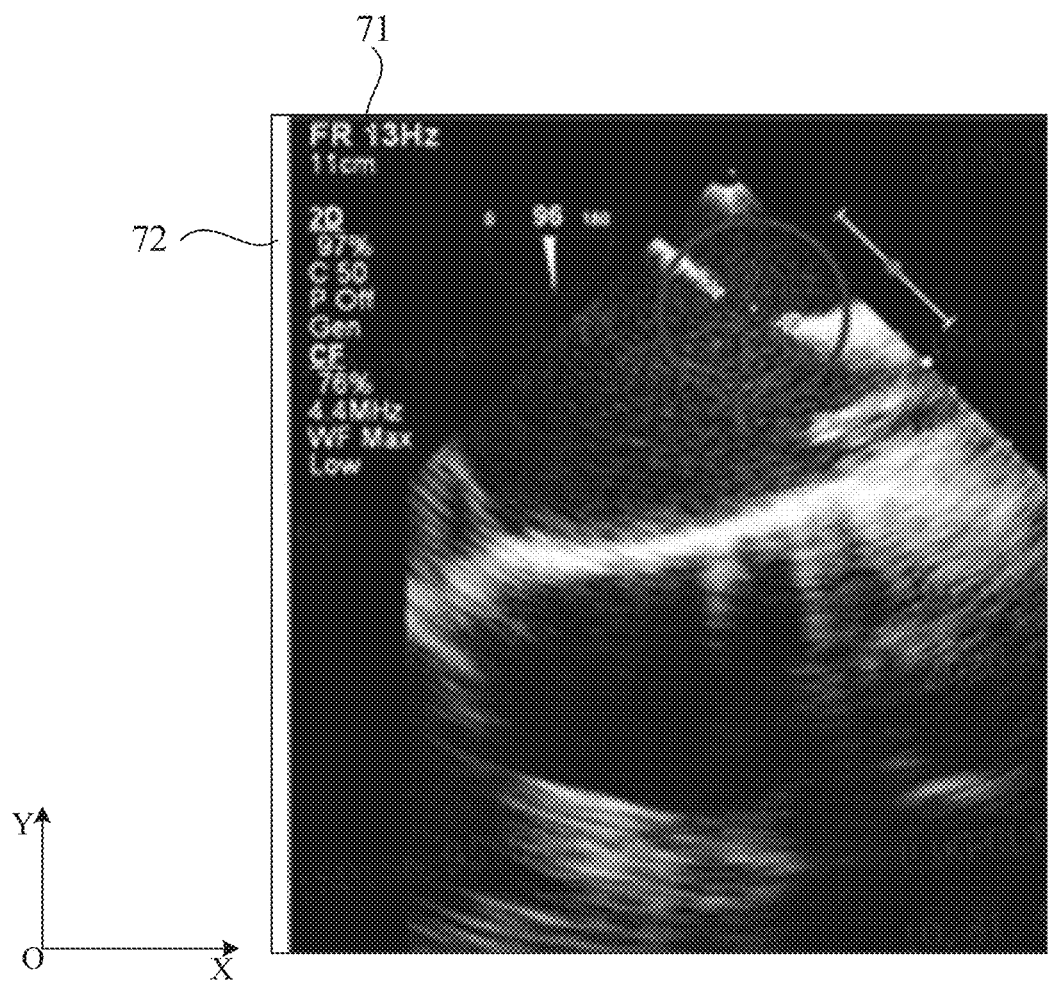
FIG. 8 is a schematic diagram illustrating an image missing at an edge of the first image according to an embodiment of the present disclosure.

In an embodiment, after the display position of the first image is moved, an image-missing area may appear at an edge of the first image, which may cause abnormal display at an edge of the second image. A direction of the image-missing area relative to the first image is opposite to the above movement direction. For example, FIG. 7 shows the first image 71 before the display position is moved. After the display position of the first image 71 is moved in the positive X-axis direction by six first sub-pixels 211, an image-missing area 72 which may be an all-white image appears on a side of the first image 71 dose to a negative semi-axis of X-axis, as shown in FIG. 8. Therefore, the image-missing area may be adjusted to eliminate the abnormal display at the edge of the second image.

Figure 9:
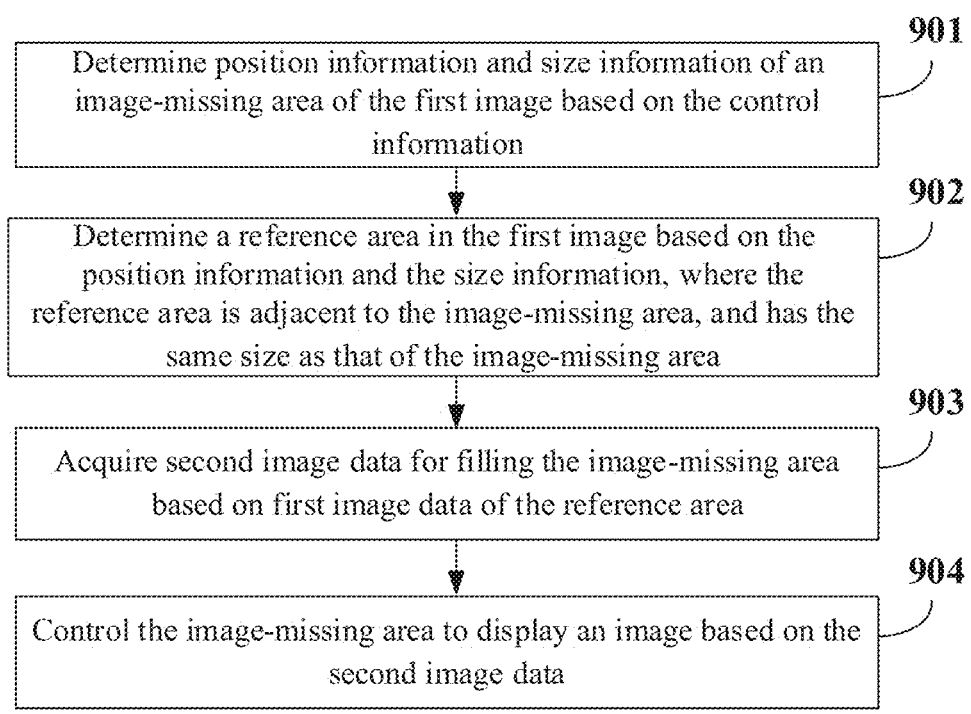
FIG. 9 is a flowchart illustrating a display control method according to another embodiment of the present disclosure.

In an embodiment, in order to eliminate the abnormal display at the edge of the second image, after the display position of the first image is moved, the display control method may further include steps 901-904 as shown in FIG. 9.

At step 901, position information and size information of the image-missing area of the first image are determined based on the control information.

In an embodiment, the position information of the image-missing area may be position information of the image-missing area relative to the first image, or the position information of the image-missing area may include position information of all sub-pixels in the image-missing area, which is not limited thereto. The size information of the image-missing area may be calculated in units of rows or columns. For example, the size information of the image-missing area may be six columns of sub-pixels. The display apparatus may determine the position information of the image-missing area based on the above-described movement direction, and determine the size information of the image-missing area based on the above-described movement distance. For example, when the movement direction is the positive X-axis direction, the determined position information of the image-missing area may be on the side of the first image 71 close to the negative semi-axis of the X-axis, and when the movement distance is six first sub-pixels 211, the determined size information of the image-missing area may be six columns of sub-pixels.

At step 902, a reference area in the first image is determined based on the position information and the size information, where the reference area is adjacent to the image-missing area, and has the same size as that of the image-missing area.

In an embodiment, it may be determined which position and size of an area in the first image to be selected as the reference area based on the determined position information and size information of the image-missing area. In this embodiment, an area in the first image that is adjacent to the image-missing area and has the same size as that of the image-missing area is determined as the reference area based on the position information and the size information, such that there may be little difference between an image with the image-missing area filled and the first image, to achieve a smooth image transition.

Figure 10:
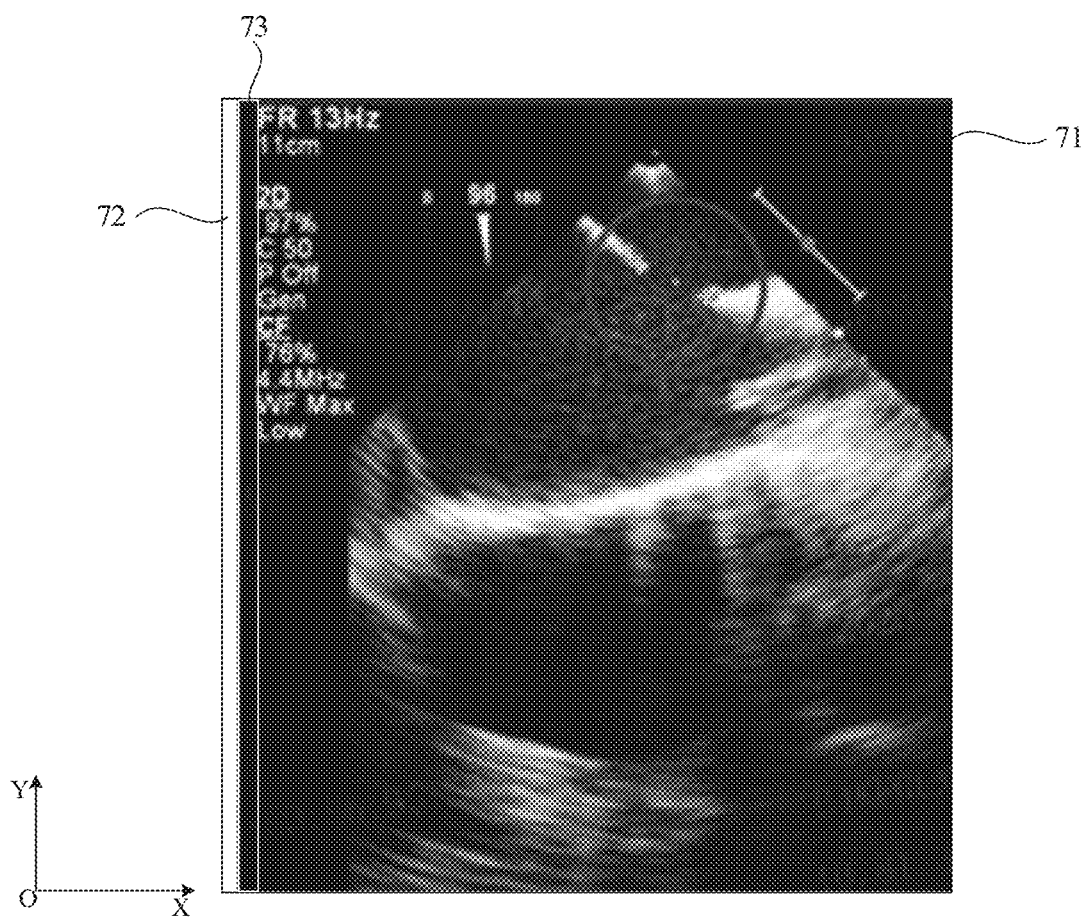
FIG. 10 is a schematic diagram illustrating a reference area according to an embodiment of the present disclosure.

For example, FIG. 10 shows a reference area 73 when the position information of the image-missing area is on the side of the first image 71 close to the negative semi-axis of the X-axis and the size information of the image-missing area is six columns of sub-pixels. As shown in FIG. 10, the reference area 73 is adjacent to the image-missing area 72, and has the same size as that of the image-missing area 72, that is, six columns of sub-pixels.

At step 903, second image data for filling the image-missing area is acquired based on first image data of the reference area.

In an embodiment, when there is little difference in pixel values of the sub-pixels in the reference area, for example, the reference area is solid-colored or gray, the first image data of the reference area may be copied to obtain the second image data for filling the image-missing area, and the image-missing area may be filled with the second image data. Such an application scenario is more common in medical applications. In an implementation, when a difference in averages of pixel values between every two adjacent rows of sub-pixels arranged along a first direction in the reference area is less than or equal to a preset value, the first image data of the reference area is copied to obtain the second image data, where the first direction is perpendicular to the movement direction for controlling the movement of the display position of the first image. For example, when the movement direction is the X-axis direction, the first direction is the Y-axis direction. When a difference in averages of pixel values between every two adjacent columns of sub-pixels arranged along the Y-axis direction in the reference area 73 is less than or equal to a preset value, the first image data of the reference area 73 may be copied to obtain the second image data.

In an embodiment, when there is a relatively large difference in the pixel values of the sub-pixels in the reference area, a preset filter kernel may be used to process the first image data of the reference area and third image data in a neighborhood of the reference area, to obtain the second image data for filling the image-missing area. The neighborhood of the reference area may be determined based on a size of the preset filter kernel. If the size of the preset filter kernel is k*k, the neighborhood of the reference area is (k−1) row(s) of sub-pixels arranged along the first direction in the first image and adjacent to the reference area. The filter kernel may be a convolution kernel. For example, if k is 3, the preset filter kernel may be a 3*3 convolution kernel, and the neighborhood of the reference area may be two rows of sub-pixels arranged along the first direction in the first image and adjacent to the reference area. The 3*3 convolution kernel may be used to determine an average of the pixel values of the sub-pixels in the reference area and in the neighborhood of the reference area to obtain the second image data. In an implementation, when the difference in the averages of the pixel values between every two adjacent rows of the sub-pixels arranged along the first direction in the reference area is greater than the preset value, average filtering is performed on the first image data of the reference area and the third image data in the neighborhood of the reference area using a preset filter kernel to obtain the second image data. For example, when the movement direction is the X-axis direction, and the difference in the averages of the pixel values between every two adjacent columns of the sub-pixels arranged along the Y-axis direction in the reference area 73 is greater than the preset value, the average filtering may be performed on the first image data of the reference area 73 and the third image data in the neighborhood of the reference area 73 using the 3*3 convolution kernel to obtain the second image data, where the neighborhood of the reference area 73 may be two columns of sub-pixels arranged along the Y-axis direction in the first image 71 and adjacent to the reference area 73.

Taking the movement direction being the positive X-axis direction and the preset filter kernel being a 3*3 convolution kernel as an example, an implementation of step 903 is as follows:

Let an original image of the first image be denoted as
Picture=f(x,y)
Picture=f(x,y) is an image function, where x is a row function, and y is a column function.

An image obtained after the display position of the first image is moved is denoted as
Picture'=Picture1+Picture2

Where Picture' is an image composed of the image-missing area and the moved first image, Picture1 represents an image of the image-missing area, and Picture2 represents the moved first image.

Picture2=f(x, y-n), where n is the number of columns of the sub-pixels moved, for example, n is 6.

Firstly, it is determined whether the difference in the averages of the pixel values between every two adjacent columns of sub-pixels in the reference area is less than or equal to the preset value. If so, the first image data of the reference area may be copied to obtain the second image data for filling the image-missing area, and the image-missing area may be filled with the second image data. If not, the 3*3 convolution kernel may be used to determine the average of the pixel values of the sub-pixels in the reference area and in the neighborhood of the reference area to obtain the second image data. Taking n=6 as an example, an average of the pixel values of the sub-pixels from the first column to the third column in the reference area may be used as a pixel value of the first column of sub-pixels in the image-missing area, that is, an average of the pixel values of the sub-pixels from the first column to the third column in the moved first image may be used as the pixel value of the first column of sub-pixels in the image-missing area; an average of the pixel values of the sub-pixels from the second column to the fourth column in the reference area may be used as a pixel value of the second column of sub-pixels in the image-missing area, that is, an average of the pixel values of the sub-pixels from the second column to the fourth column in the moved first image may be used as the pixel value of the second column of sub-pixels in the image-missing area; an average of the pixel values of the sub-pixels from the third column to the fifth column in the reference area may be used as a pixel value of the third column of sub-pixels in the image-missing area, that is, an average of the pixel values of the sub-pixels from the third column to the fifth column in the moved first image may be used as the pixel value of the third column of sub-pixels in the image-missing area; and so on . . . , an average of the pixel values of the sub-pixels in the sixth column in the reference area and in the first column and the second column in the neighborhood of the reference area may be used as a pixel value of the sixth column of sub-pixels in the image-missing area, that is, an average of the pixel values of the sub-pixels from the sixth column to the eighth column in the moved first image may be used as the pixel value of the sixth column of sub-pixels in the image-missing area. An implementation is as follows:

I(m)=double(Picture2 (:, m)), m=1, 2 . . . n, where n is a movement distance in the unit of the first sub-pixel, for example, n is 6, and I(m) is an average of the pixel values of the m-th column of sub-pixels;

If I(m+1)−I(m)≤Dif(k)//Dif(k) is a constant matrix;
Picture1=f(x,n)
If I(m+1)−I(m)>Dif(k),
Picture1=L(a,b)//a is a row function, and b is a column function
Picture2=P(a,b)

$$L(a_m,b_m)=\text{Mean}(P(a_m,b_m)+P(a_{m+1},b_{m+1})+P(a_{m+2},b_{m+2}))//\text{In the unit of } 3*3$$

At step 904, the image-missing area is controlled to display an image based on the second image data.

In an embodiment, the image-missing area may be controlled to display an image based on the second image data, such that there may be little difference between an image displayed in the image-missing, area and an image in the reference area, to achieve a smooth image transition.

In this embodiment, control information for controlling movement of a display position of a first image is acquired in response to entering an image adjustment display mode, and the display position of the first image is moved based on the control information, which can reduce or eliminate image ghosting. Moreover, the first image may be moved according to information input by a user to reduce or eliminate the image ghosting until the user is satisfied with the adjustment result, which can improve user experience.

Figure 11:
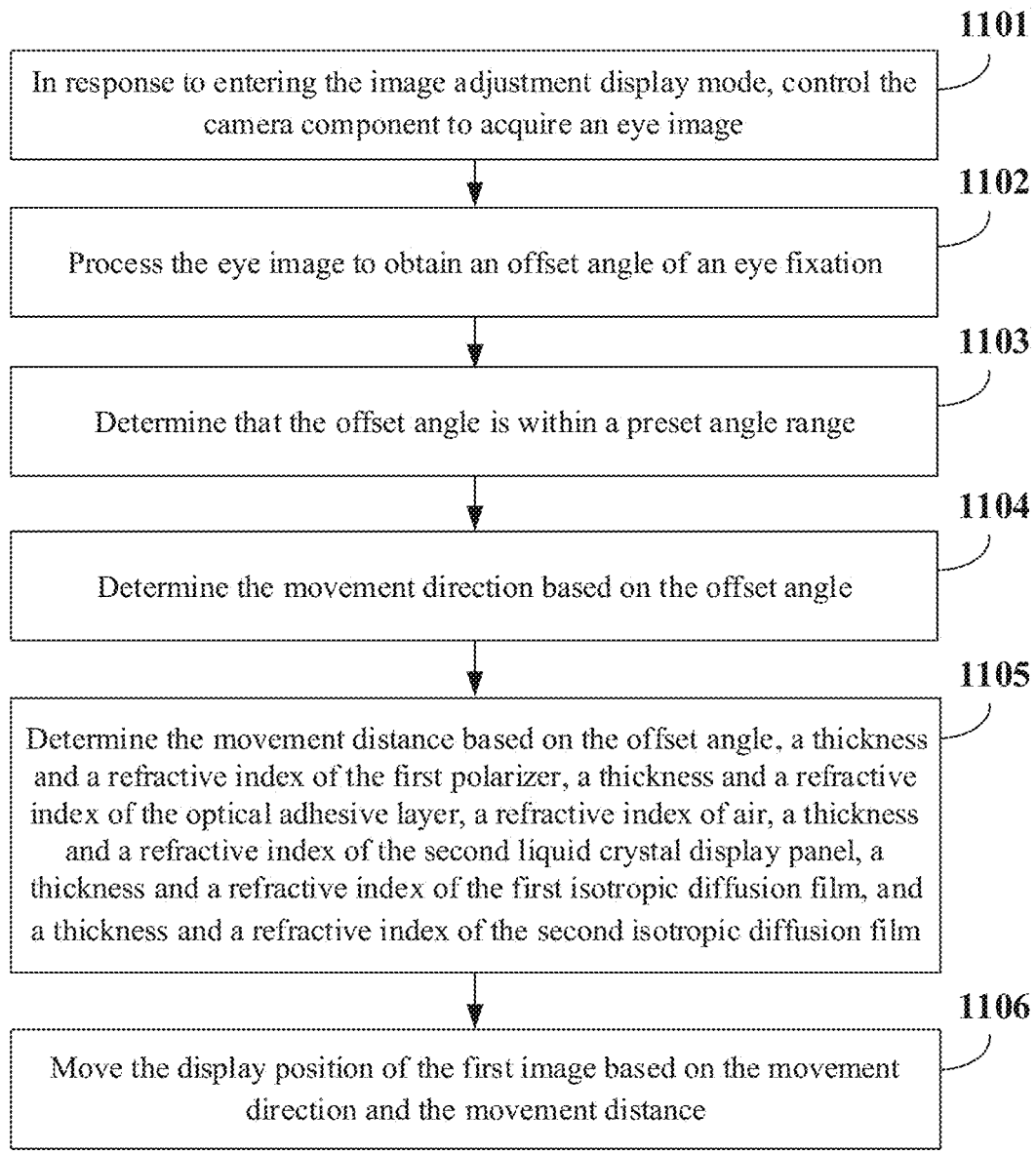
FIG. 11 is a flowchart illustrating a display control method according to another embodiment of the present disclosure.

The embodiments of the present disclosure further provide a display control method. The display control method may be applied to the display apparatus shown in FIG. 2. In this embodiment, acquiring the control information by using an eye tracking technology will be taken as an example for illustration. As shown in FIG. 11, the display control method may include steps 1101-1106.

At step 1101, an eye image is acquired in response to entering the image adjustment display mode.

In an embodiment, the display apparatus may further include a camera component. In response to entering the image adjustment display mode, the display apparatus may acquire the eye image through the camera component.

At step 1102, the eye image is processed to obtain an offset angle of an eye fixation.

In an embodiment, the eye image may be processed to obtain the offset angle of the eye fixation. The offset angle of the eye fixation may be an angle between line of sight of the user and a reference direction. The line of sight may be a line connecting the eye fixation and the eye (for example, an eyeball) of the user, which is a virtual line. The reference direction may be perpendicular to a line connecting the user's eyes and point to the display apparatus, but is not limited thereto.

At step 1103, it is determined that the offset angle is within a preset angle range.

In an embodiment, the preset angle range may be pre-stored in the display apparatus, and is configured to indicate that the offset angle of the eye fixation is greater than a preset threshold. That is to say, when the offset angle is within the preset angle range, it indicates that the offset angle is relatively large, and the above-mentioned image ghosting is most likely to occur.

In an embodiment, after obtaining the offset angle of the eye fixation, the display apparatus may determine whether the offset angle is within the preset angle range, and perform step 1104 when determining that the offset angle is within the preset angle range.

At step 1104, the movement direction is determined based on the offset angle of the eye fixation.

In an embodiment, the display apparatus may determine the movement direction based on the offset angle of the eye fixation. For example, when the offset angle indicates that the line of sight is inclined to a positive semi-axis of the X-axis, it may be determined that the movement direction is the positive X-axis direction. When the offset angle indicates that the line of sight is inclined to a positive semi-axis of Y-axis, it may be determined that the movement direction is the positive Y-axis direction.

At step 1105, the movement distance is determined based on the offset angle of the eye fixation, a thickness and a refractive index of a first polarizer, a thickness and a refractive index of an optical adhesive layer, a refractive index of air, a thickness and a refractive index of the second liquid crystal display panel, a thickness and a refractive index of a first isotropic diffusion film, and a thickness and a refractive index of a second isotropic diffusion film.

In an embodiment, as shown in FIG. 2, the display apparatus may further include an optical adhesive layer 24, a first isotropic diffusion film (IDF) 25, a second isotropic diffusion film 26, a first polarizer 27, and a second polarizer 28. The second liquid crystal display panel 22 may include second sub-pixels 221 arranged in an array, and the second sub-pixels 221 may include red sub-pixels R, green sub-pixels G, and blue sub-pixels B arranged in an array. A thickness of the second liquid crystal display panel 22 may be about 1 mm. A thickness of the second polarizer 28 may be about 0.155 mm, and a thickness of the first polarizer 27 may be about 0.155 mm. A thickness of the first isotropic diffusion film 25 may be about 0.145 mm, and a thickness of the second isotropic diffusion film 26 may be about 0.145 mm. A thickness of the optical adhesive layer 24 may be about 0.25 mm, and the optical adhesive layer 24 may be transparent, but is not limited thereto.

As shown in FIG. 2, an offset distance D between the second image and the ghost image may be (d2+d3+d4). The movement distance may be equal to the offset distance D, or may be equal to a result obtained by rounding a ratio of the offset distance to the spacing between the two adjacent first sub-pixels. The offset distance D may be determined based on law of refraction, the offset angle θ1 of the eye fixation, the thickness of the first isotropic diffusion film 25, the thickness of the second isotropic diffusion film 26, the thickness of the first polarizer 27, the thickness of the optical adhesive layer 24, the thickness of the second liquid crystal display panel 22, the refractive index of the first isotropic diffusion film 25, the refractive index of the second isotropic diffusion film 26, the refractive index of the first polarizer 27, the refractive index of the optical adhesive layer 24, the refractive index of the second liquid crystal display panel 22, and the refractive index of air. Incidence angles θ2, θ3, θ4 and θ5 may not be directly used during the determination of the offset distance D. In an embodiment, the offset distance D may be determined using the following formula (1):

$$D = k_2 \tan[\arc(k_3 \sin \theta 1)] + k_4 \tan[\arc(k_5 \sin \theta 1)] + k_6 \tan[\arc(k_7 \sin \theta 1)] \quad (1)$$

Where, $k_2$ is the thickness of the second liquid crystal display panel 22, $k_3 = n0/n2$, n0 is the refractive index of air, n2 is the refractive index of the second liquid crystal display panel 22, $k_4$ is a sum of the thickness of the first isotropic diffusion film 25, the thickness of the second isotropic diffusion film 26, and the thickness of the first polarizer 27, $k_5 = n0/n3$, n3 is an average of the refractive index of the first isotropic diffusion film 25, the refractive index of the second isotropic diffusion film 26, and the refractive index of the first polarizer 27, $k_6$ is the thickness of the optical adhesive layer 24, $k_7 = n0/n4$, and n4 is the refractive index of the optical adhesive layer 24.

When the movement distance is equal to the result obtained by rounding the ratio of the offset distance to the spacing between the two adjacent first sub-pixels, the movement distance may be INT (D/S), where S is the spacing between the two adjacent first sub-pixels, and INT is a rounding function.

In an embodiment, the display apparatus may pre-store a preset calculation formula for calculating the movement distance based on the offset angle of the eye fixation. The display apparatus may calculate the movement distance based on the offset angle of the eye fixation and the preset calculation formula.

At step 1106, the display position of the first image is moved based on the movement direction and the movement distance.

In this embodiment, the display apparatus may move the display position of the first image based on the movement direction and the movement distance as determined above.

In this embodiment, the display apparatus may position the offset angle of the eye fixation, and obtain the movement direction of the first image and the corresponding number of the first sub-pixels (i.e., the movement distance) through calculation, so as to enable an automatic image adjustment.

The embodiments of the present disclosure further provide a display apparatus. The display apparatus may be the display apparatus shown in FIG. 2. The display apparatus includes a processor, a backlight component, a first liquid crystal display panel 21 and a second liquid crystal display panel 22 that are stacked. The backlight component is configured to provide backlight for the first liquid crystal display panel 21 and the second liquid crystal display panel 22. The first liquid crystal display panel 21 is located between the backlight component and the second liquid crystal display panel 22 and configured to display a first image, and the second liquid crystal display panel 22 is configured to display a second image. The processor is configured to: in response to entering an image adjustment display mode, acquire control information for controlling movement of a display position of the first image; and move the display position of the first image based on the control information.

In an embodiment, the processor may be located on the FPGA, but is not limited thereto.

In an embodiment, the display apparatus may further include a camera component, an optical adhesive layer 24, a first isotropic diffusion film 25, a second isotropic diffusion film 26, a first polarizer 27, and a second polarizer 28. The optical adhesive layer 24 is located on a side of the first liquid crystal display panel 21 close to the second liquid crystal display panel 22. The first polarizer 27 is located on a side of the second liquid crystal display panel 22 close to the first liquid crystal display panel 21. The first isotropic diffusion film 25 and the second isotropic diffusion film 26 are stacked between the optical adhesive layer 24 and the first polarizer 27. The second polarizer 28 is located on a side of the second liquid crystal display panel 22 away from the first liquid crystal display panel 21. The processor may be further configured to: in response to entering the image adjustment display mode, control the camera component to acquire an eye image; process the eye image to obtain an offset angle of an eye fixation; determine that the offset angle is within a preset angle range; determine the movement direction based on the offset angle; determine the movement distance based on the offset angle, a thickness and a refractive index of the first polarizer, a thickness and a refractive index of the optical adhesive layer, a refractive index of air, a thickness and a refractive index of the second liquid crystal display panel, a thickness and a refractive index of the first isotropic diffusion film, and a thickness and a refractive index of the second isotropic diffusion film; and move the display position of the first image based on the movement direction and the movement distance.

In this embodiment, control information for controlling movement of a display position of a first image is acquired in response to entering an image adjustment display mode, and the display position of the first image is moved based on the control information, which can reduce or eliminate image ghosting in a second image displayed on a second liquid crystal display panel. Therefore, with the embodiments of the present disclosure, image ghosting in an image can be reduced or eliminated.

For the display apparatus in the foregoing embodiment, the specific manner in which the processor performs operations has been described in detail in the relevant method embodiments, which will not be repeated herein.

Figure 12:
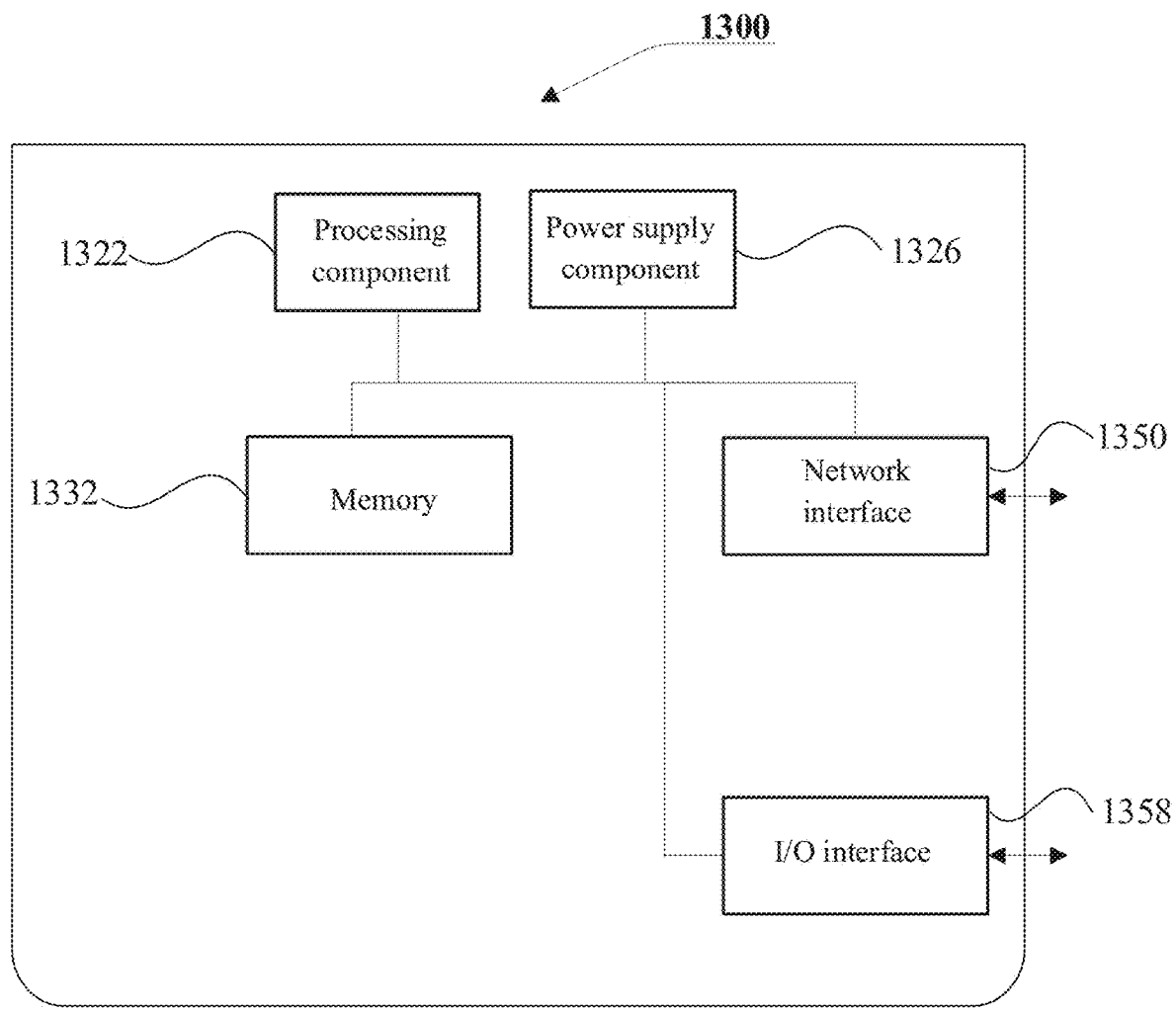
FIG. 12 is a schematic structural diagram illustrating a display apparatus according to an embodiment of the present disclosure.

FIG. 12 is a block diagram illustrating a display apparatus according to an exemplary embodiment. With reference to FIG. 12, the display apparatus 1300 includes a processing component 1322, which further includes one or more processors, and a memory resource represented by a memory 1332 for storing instructions executable by the processing component 1322, such as application programs. The application programs stored in the memory 1332 may include one or more modules each corresponding to a set of instructions. In addition, the processing component 1322 is configured to execute the instructions to perform the display control method described above.

The display apparatus 1300 may further include: a power supply component 1326, configured to perform power management of the display apparatus 1300; a wired or wireless network interface 1350, configured to connect the display apparatus 1300 to a network; and an input/output (I/O) interface 1358. The display apparatus 1300 may be operated based on an operating system stored in the memory 1332, for example, Windows Server™, Mac OS X™, Unix™, Linux™, FreeBSD™ or the like.

In an exemplary embodiment, there is also provided a non-transitory computer-readable storage medium including instructions, such as the memory 1332 including instructions, which may be executed by the processing component 1322 of the display apparatus 1300 to implement the display control method described above. For example, the non-transitory computer-readable storage medium may include read only memory (ROM), random access memory (RAM), CD-ROM, magnetic tape, floppy disk, optical data storage device, etc.

In the present disclosure, terms "first" and "second" are only used for descriptive purposes, and cannot be understood as indicating or implying relative importance. Term "a plurality of" refers to two or more, unless specifically defined otherwise.

Those skilled in the art will easily conceive of other embodiments of the present disclosure after considering the specification and practicing the disclosure disclosed herein. The present disclosure is intended to cover any variations, uses or adaptive changes of the present disclosure. These variations, uses or adaptive changes follow the general principles of the present disclosure and include common knowledge or conventional technical means in the art that are not disclosed by the present disclosure. The description and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes may be made without departing from the scope thereof. The scope of the present disclosure is only limited by the appended claims.

The invention claimed is:

1. A display control method, which is applied to a display apparatus comprising a backlight component, and a first liquid crystal display panel and a second liquid crystal display panel that are stacked, the first liquid crystal display panel being located between the backlight component and the second liquid crystal display panel and configured to display a first image, and the second liquid crystal display panel being configured to display a second image, the method comprising:

in response to entering an image adjustment display mode, acquiring control information for controlling movement of a display position of the first image;

moving the display position of the first image based on the control information;

determining position information and size information of an image-missing area of the first image based on the control information;

determining a reference area in the first image based on the position information and the size information, the reference area being adjacent to the image-missing area, and having a same size as that of the image-missing area;

acquiring second image data for filling the image-missing area based on first image data of the reference area; and controlling the image-missing area to display an image based on the second image data.

2. The display control method according to claim 1, wherein the control information comprises a movement direction and a movement distance for controlling the movement of the display position; and the first liquid crystal display panel comprises first sub-pixels arranged in an array, and the movement distance uses the first sub-pixel as a unit and is an integer multiple of the first sub-pixel.

3. The display control method according to claim 2, wherein the display apparatus further comprises a camera component, an optical adhesive layer, a first isotropic diffusion film, a second isotropic diffusion film, a first polarizer, and a second polarizer, the optical adhesive layer is located on a side of the first liquid crystal display panel close to the second liquid crystal display panel, the first polarizer is located on a side of the second liquid crystal display panel close to the first liquid crystal display panel, the first isotropic diffusion film and the second isotropic diffusion film are stacked between the optical adhesive layer and the first polarizer, and the second polarizer is located on a side of the second liquid crystal display panel away from the first liquid crystal display panel, and acquiring the control information for controlling the movement of the display position of the first image comprises:

in response to entering the image adjustment display mode, controlling the camera component to acquire an eye image;

processing the eye image to obtain an offset angle of an eye fixation;

determining that the offset angle is within a preset angle range;

determining the movement direction based on the offset angle; and determining the movement distance based on the offset angle, a thickness and a refractive index of the first polarizer, a thickness and a refractive index of the optical adhesive layer, a refractive index of air, a thickness and a refractive index of the second liquid crystal display panel, a thickness and a refractive index of the first isotropic diffusion film, and a thickness and a refractive index of the second isotropic diffusion film.

4. The display control method according to claim 3, wherein the movement distance is determined using the following formula:

$$D=k_2 \tan[\text{arc}(k_3 \sin \theta 1)]+k_4 \tan[\text{arc}(k_5 \sin \theta 1)]+k_6 \tan[\text{arc}(k_7 \sin \theta 1)]$$

wherein D is the movement distance, $k_2$ is the thickness of the second liquid crystal display panel, $k_3=n0/n2$, n0 is the refractive index of air, n2 is the refractive index of the second liquid crystal display panel, $k_4$ is a sum of the thickness of the first isotropic diffusion film, the thickness of the second isotropic diffusion film, and the thickness of the first polarizer, $k_5=n0/n3$, n3 is an average of the refractive index of the first isotropic diffusion film, the refractive index of the second isotropic diffusion film, and the refractive index of the first polarizer, $k_6$ is the thickness of the optical adhesive layer, $k_7=n0/n4$, n4 is the refractive index of the optical adhesive layer, and θ1 is the offset angle of the eye fixation.

5. The display control method according to claim 1, wherein acquiring the control information for controlling the movement of the display position of the first image comprises:

receiving the control information input by a user.

6. The display control method according to claim 1, wherein acquiring the second image data for filling the image-missing area based on the first image data of the reference area comprises:

when a difference in averages of pixel values between every two adjacent rows of sub-pixels arranged along a first direction in the reference area is less than or equal to a preset value, copying the first image data of the reference area to obtain the second image data, the first direction being perpendicular to the movement direction for controlling the movement of the display position; or when the difference in the averages of the pixel values between every two adjacent rows of the sub-pixels arranged along the first direction in the reference area is greater than the preset value, performing average filtering on the first image data and third image data in a neighborhood of the reference area using a preset filter kernel to obtain the second image data.

7. A display apparatus, comprising a processor, a backlight component, and a first liquid crystal display panel and a second liquid crystal display panel that are stacked, the first liquid crystal display panel being located between the backlight component and the second liquid crystal display panel and configured to display a first image, the second liquid crystal display panel being configured to display a second image, and the processor being configured to:

in response to entering an image adjustment display mode, acquire control information for controlling movement of a display position of the first image;

move the display position of the first image based on the control information;

determine position information and size information of an image-missing area of the first image based on the control information;

determine a reference area in the first image based on the position information and the size information, the reference area being adjacent to the image-missing area, and having a same size as that of the image-missing area;

acquire second image data for filling the image-missing area based on first image data of the reference area; and control the image-missing area to display an image based on the second image data.

8. The display apparatus according to claim 7, wherein the control information comprises a movement direction and a movement distance for controlling the movement of the display position; and the first liquid crystal display panel comprises first sub-pixels arranged in an array, and the movement distance uses the first sub-pixel as a unit and is an integer multiple of the first sub-pixel.

9. The display apparatus according to claim 8, further comprising a camera component, an optical adhesive layer, a first isotropic diffusion film, a second isotropic diffusion film, a first polarizer, and a second polarizer, the optical adhesive layer being located on a side of the first liquid crystal display panel close to the second liquid crystal display panel, the first polarizer being located on a side of the second liquid crystal display panel close to the first liquid crystal display panel, the first isotropic diffusion film and the second isotropic diffusion film being stacked between the optical adhesive layer and the first polarizer, and the second polarizer being located on a side of the second liquid crystal display panel away from the first liquid crystal display panel, wherein the processor is further configured to:

in response to entering the image adjustment display mode, control the camera component to acquire an eye image;

process the eye image to obtain an offset angle of an eye fixation;

determine that the offset angle is within a preset angle range;

determine the movement direction based on the offset angle;

determine the movement distance based on the offset angle, a thickness and a refractive index of the first polarizer, a thickness and a refractive index of the optical adhesive layer, a refractive index of air, a thickness and a refractive index of the second liquid crystal display panel, a thickness and a refractive index of the first isotropic diffusion film, and a thickness and a refractive index of the second isotropic diffusion film; and move the display position of the first image based on the movement direction and the movement distance.

10. The display apparatus according to claim 9, wherein the processor is further configured to determine the movement distance using the following formula:

$$D=k_2 \tan[\text{arc}(k_3 \sin \theta 1)]+k_4 \tan[\text{arc}(k_5 \sin \theta 1)]+k_6 \tan[\text{arc}(k_7 \sin \theta 1)]$$

wherein D is the movement distance, $k_2$ is the thickness of the second liquid crystal display panel, $k_3=n0/n2$, n0 is the refractive index of air, n2 is the refractive index of the second liquid crystal display panel, $k_4$ is a sum of the thickness of the first isotropic diffusion film, the thickness of the second isotropic diffusion film, and the thickness of the first polarizer, $k_5$=n0/n3, n3 is an average of the refractive index of the first isotropic diffusion film, the refractive index of the second isotropic diffusion film, and the refractive index of the first polarizer, $k_6$ is the thickness of the optical adhesive layer, $k_7$=n0/n4, n4 is the refractive index of the optical adhesive layer, and θ1 is the offset angle of the eye fixation.

11. The display apparatus according to claim 7, wherein when acquiring the control information for controlling the movement of the display position of the first image, the processor is further configured to:

receive the control information input by a user.

12. The display apparatus according to claim 7, wherein when the second image data for filling the image-missing area is acquired based on the first image data of the reference area, the processor is further configured to:

when a difference in averages of pixel values between every two adjacent rows of sub-pixels arranged along a first direction in the reference area is less than or equal to a preset value, copy the first image data of the reference area to obtain the second image data, the first direction being perpendicular to the movement direction for controlling the movement of the display position; or when the difference in the averages of the pixel values between every two adjacent rows of the sub-pixels arranged along the first direction in the reference area is greater than the preset value, perform average filtering on the first image data and third image data in a neighborhood of the reference area using a preset filter kernel to obtain the second image data.

13. A computer-readable storage medium having a computer program stored therein, wherein the computer program, when executed by a processor, causes the processor to:

in response to entering an image adjustment display mode, acquire control information for controlling movement of a display position of the first image;

move the display position of the first image based on the control information;

determine position information and size information of an image-missing area of the first image based on the control information;

determine a reference area in the first image based on the position information and the size information, the reference area being adjacent to the image-missing area, and having a same size as that of the image-missing area;

acquire second image data for filling the image-missing area based on first image data of the reference area; and control the image-missing area to display an image based on the second image data.

* * * * *